| United States Patent [19] | [11] Patent Number: | 4,961,786 |
|---|---|---|
| Novinson | [45] Date of Patent: | Oct. 9, 1990 |

[54] LANTHANIDE OXIDES AND PHOSPHATES FOR IMPROVING PROPERTIES OF HEATED REFRACTORY CONCRETE

[75] Inventor: Thomas Novinson, Ventura, Calif.

[73] Assignee: The United States of America as represented by the Secretary of the Navy, Washington, D.C.

[21] Appl. No.: 345,874

[22] Filed: May 1, 1989

Related U.S. Application Data

[63] Continuation-in-part of Ser. No. 161,503, Feb. 29, 1988, abandoned.

[51] Int. Cl.$^5$ .......................... C04B 7/32; C04B 35/44
[52] U.S. Cl. ...................................... 106/692; 501/124
[58] Field of Search .......................... 106/104; 501/124

[56] References Cited

U.S. PATENT DOCUMENTS

| 4,406,699 | 9/1983 | Beck et al. | 501/103 |
| 4,619,702 | 10/1986 | Gartner | 106/104 |
| 4,661,160 | 4/1987 | Novinson | 106/104 |

OTHER PUBLICATIONS

Cotten et al., "Advanced Inorganic Chemistry, A Comprehensive Text", 1962, pp. 870–872.

*Primary Examiner*—Mark L. Bell
*Assistant Examiner*—Anthony J. Green
*Attorney, Agent, or Firm*—David S. Kalmbaugh; J. M. St. Amand

[57] ABSTRACT

Certain derivatives of the lanthanide elements greatly enhance the strength of heated alumina refractories in the 500 to 1000 degree Fahrenheit temperature range. Cerium oxide, for example, when added in 1 percent to 5 percent by weight to commercial calcium aluminate cement with tabular alumina aggregate, plus 10 to 30 percent water, and fired at 500 to 1000 degrees Fahrenheit, forms a ceramic bond and becomes as strong as untreated calcium aluminate refractory concrete fired at 2000 degrees Fahrenheit. The cerium modified refractory concrete is 1000 psi to 1500 psi stronger than unmodified refractory concrete at 500 to 1000 degrees Fahrenheit.

15 Claims, 2 Drawing Sheets

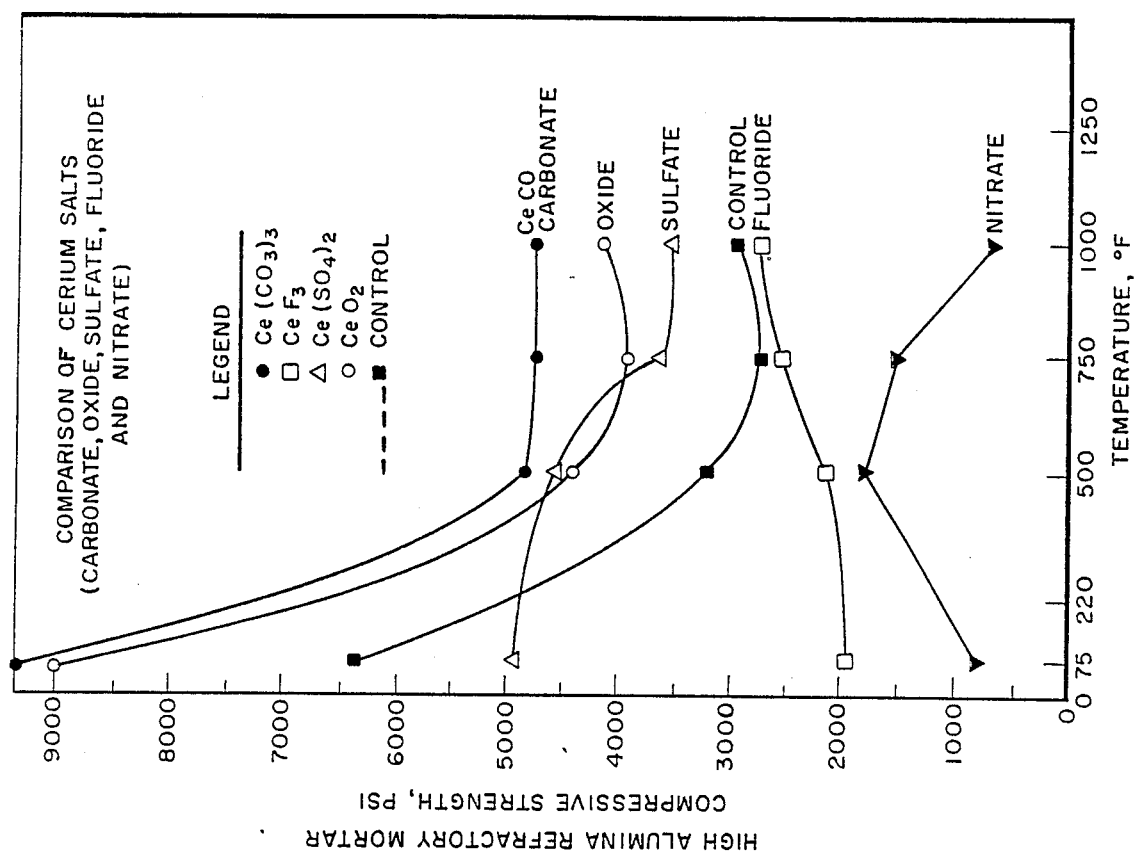
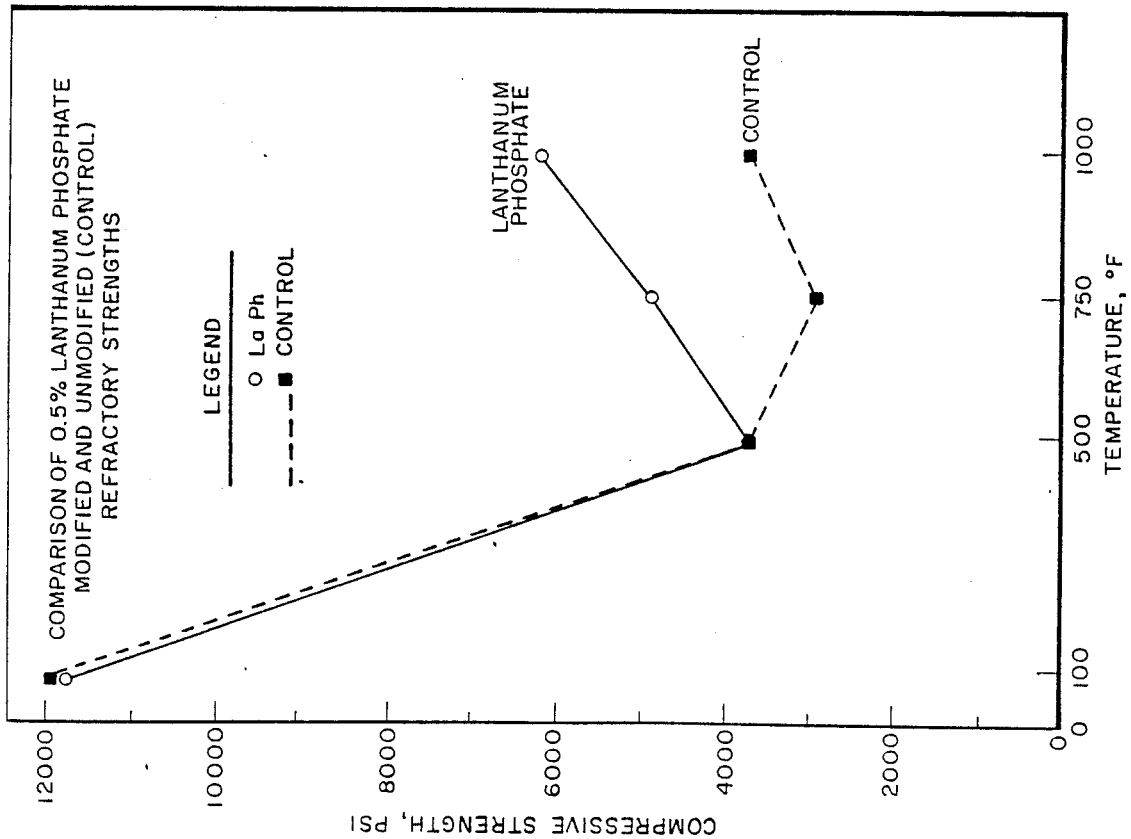

LANTHANIDE OXIDES AND PHOSPHATES FOR IMPROVING PROPERTIES OF HEATED REFRACTORY CONCRETE

This application is a continuation-in-part of U.S. application Ser. No. 161,503, filed Feb. 29, 1988 by Thomas Novinson for LANTHANIDE COMPOUNDS FOR IMPROVING PROPERTIES OF HEATED REFRACTORY CONCRETE, now abandoned.

The invention of this application relates to U.S. Pat. No. 4,661,160 issued Apr. 28, 1987 for ALKALINE EARTH METABORATES AS PROPERTY ENHANCING AGENTS FOR REFRACTORY CONCRETE by Thomas Novinson, and commonly assigned.

BACKGROUND OF THE INVENTION

The present invention relates to the use of certain lanthanide compounds, such as cerium and lanthanum oxides, carbonates, or phosphates, as strength enhancers for calcium aluminate refractory concretes, mortars, and brick products having a minimum of 40% alumina, and especially for improving the strength of alumina refractory products in the 500 to 1000 degree Fahrenheit range. Refractory products are useful in insulating portland cement concrete in jet engine test cells. Large portland cement concrete buildings are used as jet engine test cells to evaluate aircraft engines indoors so that surrounding communities will be spared from noise and smoke pollution. The problem with these engine test structures is that portland cement concrete erodes and spalls above 500 degrees Fahrenheit. The air temperature in jet engine test cells, however, has been recorded in the range of 400 to 900 degrees Fahrenheit. The resulting deterioration of the jet engine test cells thus causes: expensive shut down time for repairs; expense for the repairs; and, possible damage to expensive aircraft jet engines from concrete debris. Debris from spalling concrete can easily be swept into the air intakes of jet engines and thus seriously damage the engines.

Research has been underway to determine whether refractory mortar could be used to insulate portland cement concrete from heat. Refractory mortar is a high alumina cement mixed with bauxite or chrome ore aggregate and water. It is placed or gunned (sprayed) on as with conventional portland cement concrete products, but is then slowly heated to 2000 to 3000 degrees Fahrenheit to produce a material with ceramic like properties.

During the heating process, the refractory mortar loses a considerable amount of strength as it goes through several hydrated and dehydrated phases before reaching the ceramic phase. Unfortunately, the weakest area during the heating process is from 500 to 1000 degrees Fahrenheit, in the temperature range that has been recorded for jet engine test cell concrete surfaces during use. Thus, it is highly desirable to have a means to increase the strength of portland cement concrete in this temperature region of from 500 to 1000 degrees Fahrenheit to provide an improved refractory material.

The present invention differs from that disclosed in the aforementioned U.S. Pat. No. 4,661,160 primarily in that the present invention is for lanthanide elements. The lanthanide elements as described in Advanced Inorganic Chemistry, A Comprehensive Text by F. Albert Cotton and G. Wilkinson (Interscience Publishers, John Wiley & Sons, 1962) at chapter 31, page 870 are strictly the 14 elements following lanthanum in which the fourteen 4f electrons are being successively added to the lanthanum configuration. These fourteen elements are cerium, dysprosium, erbium, europium, gadolinium, holmium, lutetium, neodymium, praseodymium, promethium, samarium, terbium, thulium, and ytterbium. The prior art discloses alkaline earth elements, which have smaller "p" orbitals (f>d>p>s in size comparison). The lanthanide elements of the present invention all have high oxidation states of $+3$ and $+4$ [ex: $Ce^{+3}$, $Ce^{+4}$, the Ce(IV) being seen in CeO] whereas the prior art patent is limited to the $+2$ valence ($Ba^{+2}$, $Sr^{+2}$, $Ca^{+2}$, $Mg^{+2}$). The lanthanide elements form relatively water insoluble oxides (ex: $CeO_2$ is insoluble) and these oxides do not react with water to give alkaline hydroxides (pH8 or greater). In contrast, all the elements from the prior art patent have water soluble, highly reactive, alkaline oxides, which react with water to yield hydroxides [ex: BaO in water yields $Ba(OH)_2$ and SrO in water yields $Sr(OH)_2$].

Because of the differences in chemistry, it has been observed that the lanthanide compounds, particularly the oxides (ex: $CeO_2$), substitute for alumina ($Al_2O_3$) in the mortar mix; whereas, the alkaline earth compounds (ex: BaO or SrO) substitute for the lime (CaO) or calcium oxide in the mortar mix. This means that the formations of increased strength are due to two different mechanisms: the present invention in which the cerium oxide or lanthanum oxide replaces the alumina or aluminum oxide, and the prior invention of U.S. Pat. No. 4,661,160 in which the barium oxide or strontium oxide substitutes for the calcium oxide.

An advantage of the lanthanide compounds over the alkaline earth compounds is that the lanthanide oxides, phosphates, and carbonates are unreactive at room temperature and can be added directly to wet mortar or concrete mix without the development of heat (exothermic reaction) or premature flash setting (rapid hardening).

The present invention also differs from U.S. Pat. No. 4,406,699 which discloses the use of yttria additions of about 8 to 15 percent by weight as a stabilizing oxide to eliminate or substantially minimize the nonuniform expansion of zirconium oxide. U.S. Pat. No. 4,406,699 also mentions the use of the lanthanide series oxides as a substitute for yttria. U.S. Pat. No. 4,406,699 does not provide test results indicating that the lanthanide series oxides were actually tested and evaluated.

Tests were performed on refractory concrete products using yttrium oxide (yttria, $Y_2O_3$) and zirconium oxide (zirconia, $ZrO_2$) as disclosed by U.S. Pat. No. 4,406,609, as well as lanthanum oxide and phosphate and cerium oxide, phosphate and carbonate. These tests demonstrated that yttria and zirconia do not exhibit the same strength enhancement characteristics as the lanthanum oxides, phosphates, and carbonates. The strength enhancement characteristics of the lanthanide compounds were not disclosed by U.S. Pat. No. 4,406,609 and these strength enhancement characteristics were discovered only after the actual testing of the lanthanide compounds.

While yttrium is often associated with the ores of the lanthanide elements, yttrium is not in the lanthanide family according to Advanced Inorganic Chemistry, A Comprehensive Text.

SUMMARY OF THE INVENTION

In this invention, cerium oxide, for example, when added in 1 to 5 percent by weight to a calcium aluminate cement with tabular alumina aggregate plus 10 to 30 percent water and fired at from 500 to 1000 degrees Fahrenheit, forms a ceramic bond and becomes as strong as untreated calcium aluminate refractory concrete fired at 2000 degrees Fahrenheit. Furthermore, the cerium oxide modified refractory concrete is 1000 psi to 1500 psi stronger than unmodified refractory concrete at 500 to 1000 degrees Fahrenheit.

It is an object of the invention, therefore, to strengthen heated alumina refractories in the 500 to 1000 degree F. range with derivatives of specific members of the lanthanide family.

Another object of the invention is to lower the fusion point of alumina refractory concrete with lanthanide derivative additives to form ceramic bonds when fired at 500 to 1000 degree F. range, without sacrificing strength.

A further object of the invention is to increase the strength of calcium aluminate refractory concrete and mortar by at least 1000 psi in the 500 to 750 degree Fahrenheit range using lanthanide derivatives additives.

BRIEF DESCRIPTION OF THE DRAWINGS

FIG. 3 is a curve showing the comparative compressive strength for unmodified high alumina refractory mortar with that of the mortar modified with 0.5 percent lanthanum phosphate.

FIG. 4 is a curve chart showing compressive strength verses temperature for high alumina refractory mortar modified with various cerium salts used as strengthening additives.

DESCRIPTION OF THE PREFERRED EMBODIMENTS

Figure 2:
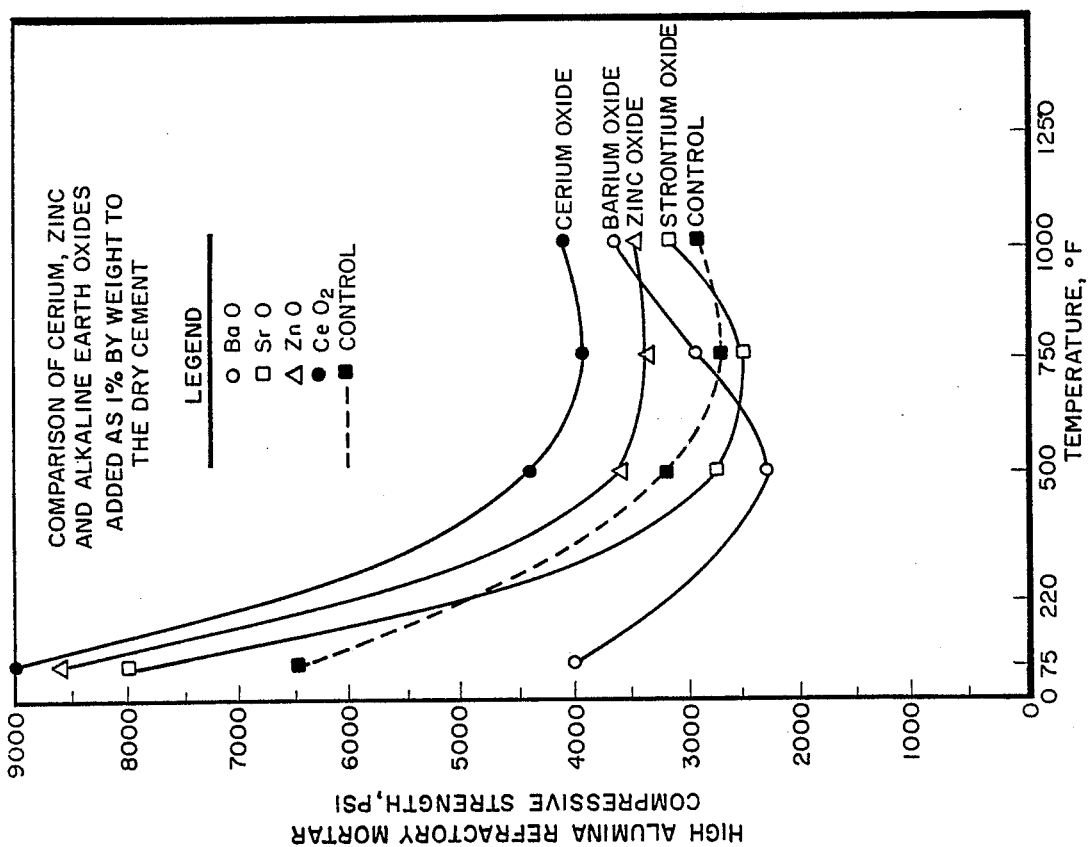
FIG. 2 is a curve showing the comparison of cerium, zinc and alkaline earth oxides as strength enhancing additives for high alumina refractory mortar.

It has been found that certain derivatives of the lanthanide elements greatly enhance the strength of heated alumina refractories in the 500 to 1000 degree Fahrenheit range. The most significant compounds are cerium oxide, lanthanum oxide and lanthanum phosphate.

The lanthanides are elements from atomic number 57 (lanthanum) to atomic number 71 (lutetium) in the periodic table. These metals all have unusual chemistry because of their "f" electron orbitals and high oxidation potential. Most of these elements resemble each other because of similar atomic radii and electronic configuration. Cerium and lanthanum are the most abundant metals in this series and several of their salts are inexpensive and readily available. The lanthanides do not include yttrium which has an atomic number of 39 and zirconium which has an atomic number of 40.

In the experimental investigation of lanthanides as enhancing additives for castable refractory mortar and concrete, 0.5 to 5 percent (preferably 1 percent) by weight of the lanthanide compound was added to 1 kilogram of commercially available high alumina calcium aluminate cement containing tabular alumina aggregate. The composition of the commercially available castable refractory or high alumina content calcium aluminate cement used in the experimental investigation was 38.31% silica ($SiO_2$), 43.64% alumina ($Al_2O_3$), 3.68% ferric oxide ($Fe_2O_3$), 0.41% magnesia (MgO) and 1.39% sodium and potassium oxide ($Na_2O$, $K_2O$). The dry mix was then mixed with 10 to 15 percent by weight of water.

As an example illustrative of the above, 45 grams (1 percent by weight) of a lanthanide compound was added to 4500 grams of commercially available high alumina castable cement and the resultant dry mix was then mixed with 675 milliliters (15 percent by weight) of water.

The resultant mortar was cast into 2 by 2 by 2 test inch cubes. The cubes were kept damp for 12 hours, then gradually heated to 220, 500, 750, and 1200 degrees Fahrenheit (in sets of three) over a six hour period. Then the cubes were allowed to cool to room temperature. When cooled, the cubes were crushed to determine test strength. Similar tests were conducted with unmodified refractory mortar, i.e. having no admixture included in the mix, used as a control. Tests also were made with mortar having 1 percent by weight of other non-lanthanide chemical admixtures, for comparison.

The test results, as shown in the curves of FIGS. 1 through 5, indicate that cerium compounds (see FIGS. 1 and 2) and lanthanum compounds (see FIGS. 1 and 3) exhibited the highest test strengths, and that these strengths were significantly higher than that of the unmodified mortar in the 500 to 1000 degree Fahrenheit range.

Figure 1:
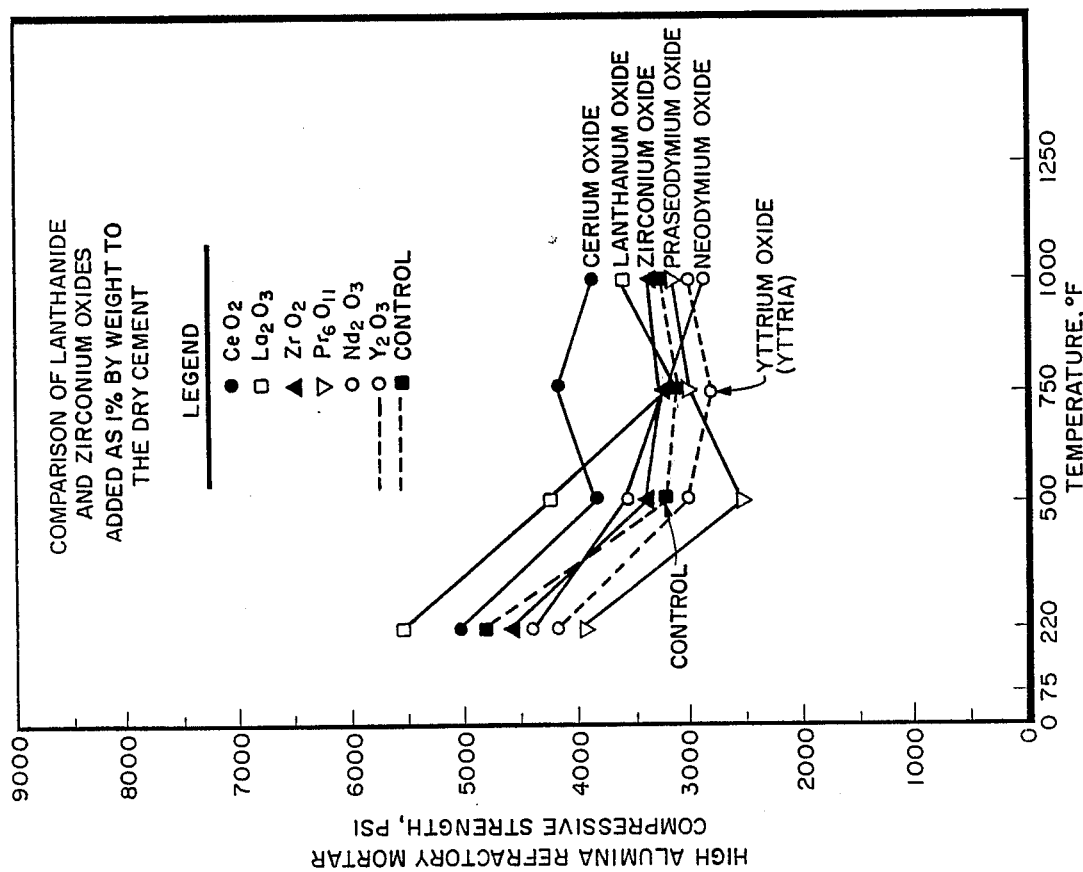
FIG. 1 is a curve chart showing the comparative compressive strength of high alumina refractory mortars modified by lanthanide, zirconium and yttrium oxides.

Cerium oxide produced much higher test strengths than closely related praseodymium and neodymium as well as zirconium and yttrium oxides incorporated as admixtures, as shown in FIG. 1. The zirconia and yttria had no appreciable effect on strength enhancement as shown on the curve of FIG. 1. Cerium oxide also produced substantially higher test strengths than zinc, barium, and strontium oxide admixtures, as shown in FIG. 2. Zirconium oxide, as well as zinc oxide admixtures provided an increase in strength over the unmodified refractory compositions in the desired temperature range, while barium oxide and strontium oxide provided an increase in strength over a portion of the desired temperature range.

A 0.5 percent by weight addition of lanthanum phosphate to high alumina calcium aluminate cement refractory mixture, as shown in FIG. 3, produced a marked increase in strength in the 500 to 1000 degree Fahrenheit temperature range.

Admixtures of non-lanthanide chemical compounds of zirconium oxide and zirconium silicate with high alumina calcium aluminate cement in the refractory, however, exhibited lower compressive strengths in the desired temperature range, as shown in FIG. 4.

Finally, it was found that cerium carbonate produced even greater test strengths than cerium oxide, which in turn was better than cerium sulfate, cerium fluoride and cerium nitrate, as shown in FIG. 5. Cerium sulfate, however, produced greater test strengths than the unmodified control mortar in the 500 to 1000 degree Fahrenheit temperature range.

Based on the studies made, certain cerium and lanthanum compounds can be useful strength enhancing additives for refractory mortars and concretes.

Obviously many modifications and variations of the present invention are possible in the light of the above teachings. It is therefore to be understood that within the scope of the appended claims, the invention may be practiced otherwise than as specifically described.

What is claimed is:

1. An improved refractory cementitious composition consisting essentially of:
    a dry mixture of a high alumina content calcium aluminate cement and approximately 0.5 to 5.0 percent by weight of dry ingredients of at least one lanthanide compound selected from the group consisting of the oxides, carbonates, phosphates and sulfates of cerium and lanthanum admixed with from 10 to 15 percent by weight of water to provide a refractory composition;
    said refractory composition when cured at a range of 500 to 1000 degrees Fahrenheit having an increased strength of up to 1500 psi over that of the same calcium aluminate cement without the added lanthanide compound.

2. A refractory composition as in claim 1 wherein said lanthanide compound is lanthanum phosphate.

3. A refractory composition as in claim 1 wherein said lanthanide compound is lanthanum oxide.

4. A refractory composition as in claim 1 wherein said lanthanide compound is cerium oxide.

5. A refractory composition as in claim 1 wherein said lanthanide compound is cerium carbonate.

6. A refractory composition as in claim 1 wherein said lanthanide compound is cerium sulfate.

7. A refractory composition as in claim 1 wherein said high alumina content calcium aluminate cement consists essentially of approximately 38% silica, approximately 43% alumina, approximately 3% ferric oxide, approximately 0.4% magnesia, and approximately 1.4% sodium and potassium oxide.

8. An improved refractory concrete consisting essentially of:
    a dry mixture of a high alumina content calcium aluminate cement and approximately one percent by weight of dry ingredients of a lanthanide compound selected from the group consisting of cerium carbonate, cerium oxide, cerium sulfate, lanthanum phosphate and lanthanum oxide admixed with from 10 to 15 percent by weight of water to provide a refractory composition;
    said refractory composition when cured at a range of 500 to 1000 degrees Fahrenheit having an increased strength of up to 1500 psi over that of the same calcium aluminate cement without the added lanthanide compound.

9. A refractory composition as in claim 8 wherein said high alumina content calcium aluminate cement consists essentially of approximately 38% silica, approximately 43% alumina, approximately 3% ferric oxide, approximately 0.4% magnesia, and approximately 1.4% sodium and potassium oxide.

10. A method of increasing the structural strength of high alumina refractory concretes and mortars, consisting essentially of:
    admixing from 0.5 to 5 percent by weight of at least one dry lanthanide compound selected from the group consisting of the oxides, carbonates, phosphates and sulfates of cerium and lanthanum with a dry alumina calcium aluminate refractory concrete;
    mixing the dry ingredients with from 10 to 15 percent by weight of water; and
    curing the resultant mixture at a range of approximately 500 to 1000 degrees Fahrenheit.

11. The method according to claim 10 wherein said lanthanide compound is lanthanum oxide.

12. The method according to claim 10 wherein said lanthanide compound is lanthanum phosphate.

13. The method according to claim 10 wherein said lanthanide compound is cerium carbonate.

14. The method according to claim 10 wherein said lanthanide compound is cerium oxide.

15. The method according to claim 10 wherein said lanthanide compound is cerium sulfate.

* * * * *